(12) United States Patent
Maillard

(10) Patent No.: US 7,272,405 B2
(45) Date of Patent: Sep. 18, 2007

(54) COMMUNICATION METHOD AND TELECOMMUNICATION NETWORK FOR PROVIDING A DATA STREAM TO A MOBILE TERMINAL

(75) Inventor: Herve Maillard, Igny (FR)

(73) Assignee: Alcatel, Paris (FR)

( * ) Notice: Subject to any disclaimer, the term of this patent is extended or adjusted under 35 U.S.C. 154(b) by 160 days.

(21) Appl. No.: 10/989,268

(22) Filed: Nov. 17, 2004

(65) Prior Publication Data

US 2005/0143098 A1 Jun. 30, 2005

(30) Foreign Application Priority Data

Dec. 26, 2003 (EP) ................... 03293355

(51) Int. Cl.
*H04Q 7/20* (2006.01)
(52) U.S. Cl. .................... 455/456.5; 455/445
(58) Field of Classification Search ............... 455/445, 455/456.5, 436–43, 439, 437, 438
See application file for complete search history.

(56) References Cited

U.S. PATENT DOCUMENTS

| 6,721,567 | B1 * | 4/2004 | Wang et al. ................ 455/440 |
| 6,947,744 | B2 * | 9/2005 | Lee ............................. 455/433 |
| 7,027,825 | B2 * | 4/2006 | Mizell et al. ............... 455/466 |
| 2002/0191554 | A1 * | 12/2002 | Kondo et al. ............... 370/328 |
| 2004/0090950 | A1 * | 5/2004 | Lauber et al. .............. 370/352 |
| 2004/0127217 | A1 * | 7/2004 | Aoki et al. ................. 455/435.1 |

FOREIGN PATENT DOCUMENTS

| EP | 1 047 275 A1 | 10/2000 |
| EP | 1 209 930 A2 | 5/2002 |
| WO | WO 03/107704 A1 | 12/2003 |

OTHER PUBLICATIONS

Zuendt Maximilian: "Seamless Handoff in Community Based and Location Aware Heterogeneous Wireless Networks" 8th International Workshop on Mobile Multimedia Conference, Oct. 5-8, 2003, pp. 1-5, XP002281321.
Satish Jamadagni: "L2 considerations for optimized IP mobility," IETF: Internet Draft: Draft-Satish-L2-MobilereQ-01. TXT, Online! Jul. 2003, pp. 1-8. XP002281322, Retrieved from the Internet: <URL: www.watersprings.org>, retrieved on May 24, 2004.

(Continued)

*Primary Examiner*—CongVan Tran
(74) *Attorney, Agent, or Firm*—Sughrue Mion, PLLC

(57) ABSTRACT

A telecommunication method for a telecommunication network providing discontinuous radio coverage is provided, in which the telecommunication network a plurality of cells, The method includes providing a data stream to a mobile terminal within the coverage of a first one of the plurality of cells, interrupting the data stream when the mobile terminal is moved outside the coverage, determining the location of the mobile terminal outside the radio coverage, predicting a second one of the plurality of cells to be the target cell of the mobile terminal, providing the data stream to a server being assigned to the second one of the plurality of the cells, resuming the data stream to the mobile terminal when the mobile terminal is within the coverage of the second one of the plurality of the cells.

9 Claims, 3 Drawing Sheets

OTHER PUBLICATIONS

Frenkiel, Richard H. et al., "The Infostations Challenge: Balancing Cost and Ubiquity in Delivering Wireless Data," Wireless Information Network Laboratory (WINLAB), Rutgers, The State University of New Jersey, Piscataway, NJ, no date listed.

Yuen, Wing Ho et al., "Exploiting Data Diversity and Multiuser Diversity in Noncooperative Mobile Infostation Networks," Wireless Information Network Laboratory (WINLAB), Rutgers University, Piscataway, NJ, no date listed.

Ratsimor, Olga, "Combining Infrastructure and Ad hoc Collaboration For Data Management in Mobile Wireless Networks." University of Maryland Baltimore County, Department of Computer Science and Electrical Engineering, Baltimore, MD, no date listed.

* cited by examiner

COMMUNICATION METHOD AND TELECOMMUNICATION NETWORK FOR PROVIDING A DATA STREAM TO A MOBILE TERMINAL

BACKGROUND OF THE INVENTION

The invention is based on a priority application EP03293355.8 which is hereby incorporated by reference.

The present invention relates to the field of telecommunications, and more particularly without limitation, to the transmission of a data stream to a mobile terminal.

Cellular voice and data networks facilitate 'anytime, anywhere' connectivity but they are expensive and offer low bandwidth. Infostation networks have been suggested as a viable alternative to meet the needs of mobile applications (Frenkiel, B. R. Badrinath, J. Borras, and R. Yates. The infostations challenge: Balancing cost and ubiquity in delivering wireless data. IEEE Person. Commun., 7(2):66-71, 2000; Exploiting Data Diversity And Multiuser Diversity In Noncooperative Mobile Infostation Networks (2003) Wing Ho Yuen, Roy D. Yates, Siun-Chuon Mau; Combining Infrastructure and Ad hoc Collaboration for Data Management in Mobile Wireless Networks (2002) Olga Ratsimor, Sethuram Balaji Kodeswaran, Anupam Joshi, Timothy Finin, Yelena Yesha ).

An infostation network consists of a set of towers offering short-range high bandwidth radio coverage. They offer high-speed discontinuous coverage, which is inherently low cost. Network access is available to users that are passing in close proximity. In this sense the infostation is similar to a base station coupled with an information server such that the base station provides the network connectivity while the information server handles the data requests. A mobile terminal thus experiences areas of connectivity (when close to an infostation) and areas of disconnection (when there is no infostation nearby).

SUMMARY OF THE INVENTION

The present invention provides for a telecommunication method and a telecommunication network providing discontinuous radio coverage, such as an infostation network. A data stream is provided to a mobile terminal when it is within the coverage of a cell of the telecommunication network, e.g. in close proximity to an infostation. When the mobile terminal is moved outside the coverage provided by the telecommunication network the data stream is interrupted.

While the mobile terminal is outside the coverage of the telecommunication network its location is determined. The corresponding location information is provided to a component of the telecommunication network, e.g. the information server, for prediction of a target cell of the telecommunication network to which the mobile terminal is going to move. The data stream for the mobile terminal is provided to the predicted target cell before the mobile terminal has actually reached the target cell. This way the transmission of the data stream to the mobile terminal can be resumed when the mobile terminal has reached the target cell with minimal latency time.

In accordance with a preferred embodiment of the invention the location determination of the mobile terminal is performed by means of a second network, such as a cellular network having global coverage, e.g. GSM, GPRS, UMTS-FDD, or hot sport oriented cellular networks, e.g. WLAN or UMTS-TDD, or a tag based location system. Alternatively a satellite positioning system, such as GPS, or other location determination techniques such as triangulation can be utilised.

In accordance with a preferred embodiment of the invention the data stream to the mobile terminal is encrypted, e.g. by means of a licence key. In order to further reduce the latency time for resuming the data stream to the mobile terminal the cryptographic key is transmitted to the target cell prior to arrival of the mobile terminal. This way it is avoided that the target cell requests the cryptographic key when the mobile terminal arrives within the coverage of the target cell and requests resumption of the data stream.

In accordance with a further preferred embodiment of the invention a historical movement pattern of the mobile terminal is used as a basis for predicting of the target cell. For example the historical movement pattern comprises a number of typical itineraries of the user. Such typical itineraries can be acquired by tracking movement of the mobile terminal. One of the typical itineraries is identified as the actual itinerary by means of the location information. This way the target cell is identified.

In accordance with a further preferred embodiment of the invention the historical movement pattern includes a bifurcation, i.e. two different paths having the same originating cell but alternative target cells. The presence server indicates along which one of the alternative branches the mobile terminal travels which enables the information server to determine the target cell.

In accordance with a further preferred embodiment of the invention the information server subscribes to the location information, i.e. the information server continuously receives location information regarding the actual position of the mobile terminal outside the coverage of the telecommunication system. This way the precise trajectory of the mobile terminal's movement can be determined for making a more precise prediction of the target cell and/or arrival time at the target cell.

It is to be noted that the present invention is particularly advantageous as it enables a more precise prediction of a target cell while the mobile terminal is outside the radio coverage in order to prepare resumption of the data streaming. This way latency times for resumption of the data streaming are substantially reduced.

BRIEF DESCRIPTION OF THE DRAWINGS

In the following preferred embodiments of the invention are described in greater detail by way of example only and by making reference to the drawings in which.

DETAILED DESCRIPTION

Figure 1:
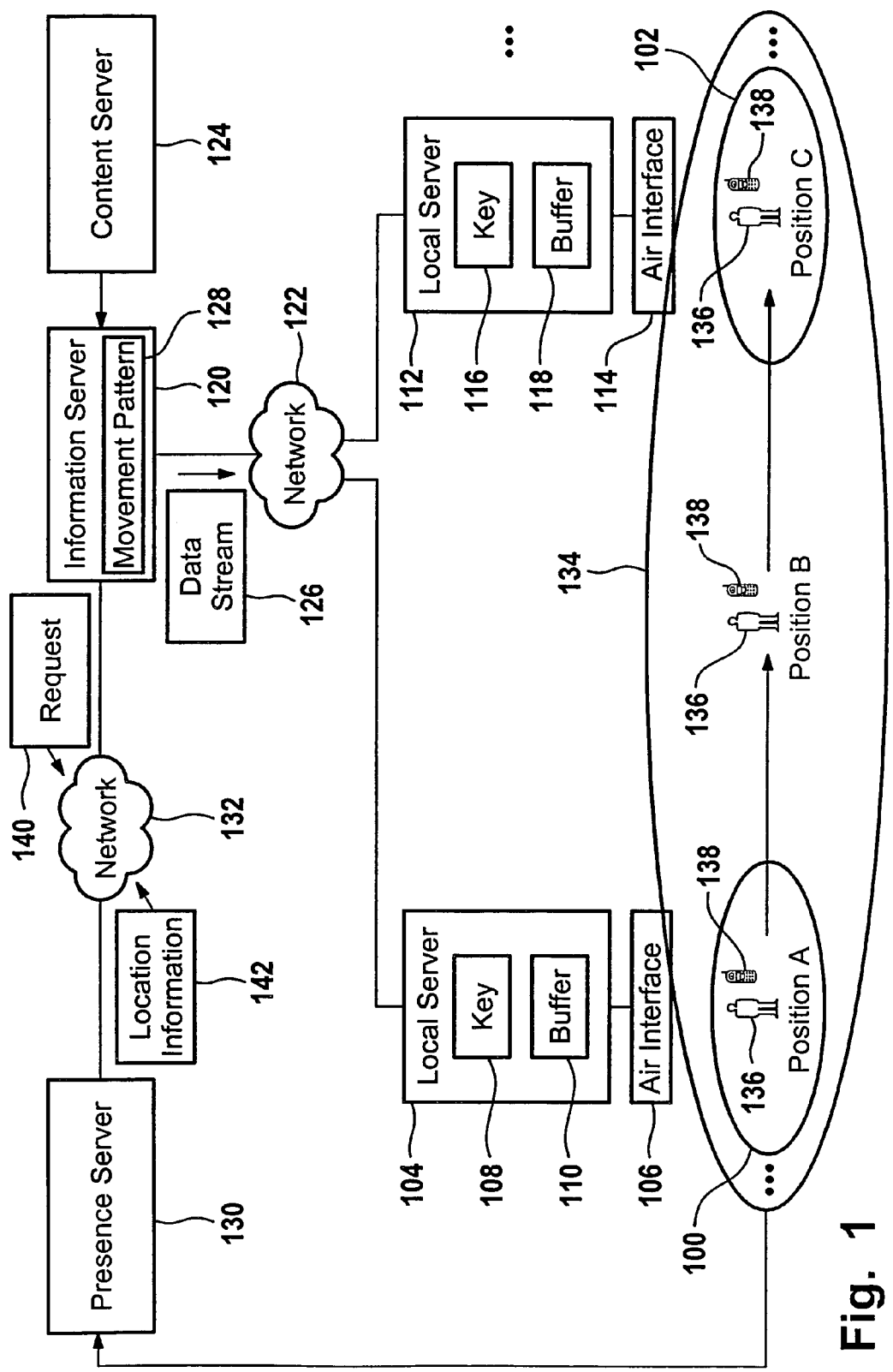
FIG. 1 is a block diagram of an embodiment of a telecommunication system of the invention.

FIG. 1 shows a block diagram of an infostation network that provides discontinuous radio coverage. The infostation network has a number of cells—the so called 'infostations'—100, 102, . . . Each one of the cells 100, 102, . . . has an assigned local server. Cell 100 has local server 104 that is coupled to air interface 106 in order to provide radio coverage for cell 100. Local server 104 has memory 108 for storing a cryptographic key and buffer memory 110.

Likewise cell 102 has an assigned local server 112 that has a similar design as location server 104. Local server 112 is coupled to air interface 114 and has memory 116 for storage of a cryptographic key and buffer memory 118. The local servers 104, 112, . . . that are assigned to individual cells 100, 102, . . . are coupled to information server 120 of the infostation network by means of transfer network 122.

Information server 120 is coupled to content server 124 for providing data stream 126 to one of the local servers 104, 112, . . . for transmission to a mobile terminal being within the respective radio coverage. Information server 120 has database 128 for storage of movement patterns on a per user basis.

Further information server 120 is coupled to presence server 130 through transport network 132. Presence server 130 belongs to wireless network 134 that provides continuous coverage and location information regarding the actual location of mobile terminals. For example wireless network 134 is a GSM, GPRS, UMTS-FDD, WLAM, UMTS-TDD or other type of network.

The presence server 130 provides the location of an active mobile terminal within the coverage of wireless network 134 on the basis of an appropriate positioning technique, such as by providing a cell ID or tag ID, by triangulation, or other techniques that are used for location based services in such cellular telecommunication networks. Alternatively wireless network 134 is not a telecommunication network but merely serves the purpose of positioning the mobile terminal, as for instance the GPS satellite based positioning system.

In operation user 136 having mobile terminal 138 is in position A within the radio coverage of cell 100. Mobile terminal 138 can be any type of mobile communication device such as a mobile phone, personal digital assistant (PDA), a portable computer having a wireless interface, or a communication device being attached to a vehicle, such as a car.

Mobile terminal 138 receives data stream 126 over air interface 106 from local server 104. Data stream 126 is buffered in buffer memory 110 of local server 104 before transmission to mobile terminal 138. Data stream 126 is transformed by means of a cryptographic key that is stored in memory 108 before transmission to mobile terminal 138.

Data stream 126 can have any content, such as information, news, audio and/or video data for rendering on mobile terminal 138. The content is delivered from content server 124 to information server 120 where it is transformed into data stream 126 that is transferred via transport network 122 to local server 104.

Typically the data rate of the data transmission of data stream 126 via air interface 106 to mobile terminal 138 is above the data rate for rendering of data stream 126 on mobile terminal 138. This enables mobile terminal 138 to fill its buffer with a portion of data stream 126 for rendering while mobile terminal 138 is outside the coverage of one of the cells 100, 102, . . . of the infostation-like network.

When user 136 moves mobile terminal 138 outside the radio coverage of cell 100 this is signaled to information server 120 and the transmission of data stream 126 to local server 104 as well as the transmission of the data stream via air interface 106 is interrupted. When user 136 moves from position A to B it is still within the coverage of wireless network 134. Thus, the location of user 136 at position B is determined by presence server 130 of wireless network 134.

When information server 120 receives signaling information that indicates that mobile terminal 138 has left cell 100 it sends one or more request 140 via transport network 132 to presence server 130 in order to obtain location information 142 regarding the actual location of mobile terminal 138 from presence server 130. In response to request 140 presence server 130 sends location information 142 back too information server 120 via network 132.

On the basis of location information 142 and user's 136 movement pattern stored in database 128, information server 120 predicts target cell 102 to which user 136 is likely to move considering its actual position B and its historical movement pattern stored in database 128.

After cell 102 has been identified as the likely target cell the information server 120 resumes transmission of data stream 126. As cell 102 has been identified as the likely target cell data stream 126 is transferred to local server 112 over transport network 122 in order to prefetch the data into buffer memory 118. Further the cryptographic key for transformation of data stream 126 is transferred into memory 116 of local server 112. Thus, at the time of arrival of user 136 at position C the transmission of data stream 126 to mobile terminal 138 is resumed with minimal delay via air interface 114 as data of data stream 126 is already prefetched in buffer memory 118 and the cryptographic key is already stored in memory 116.

Figure 2:
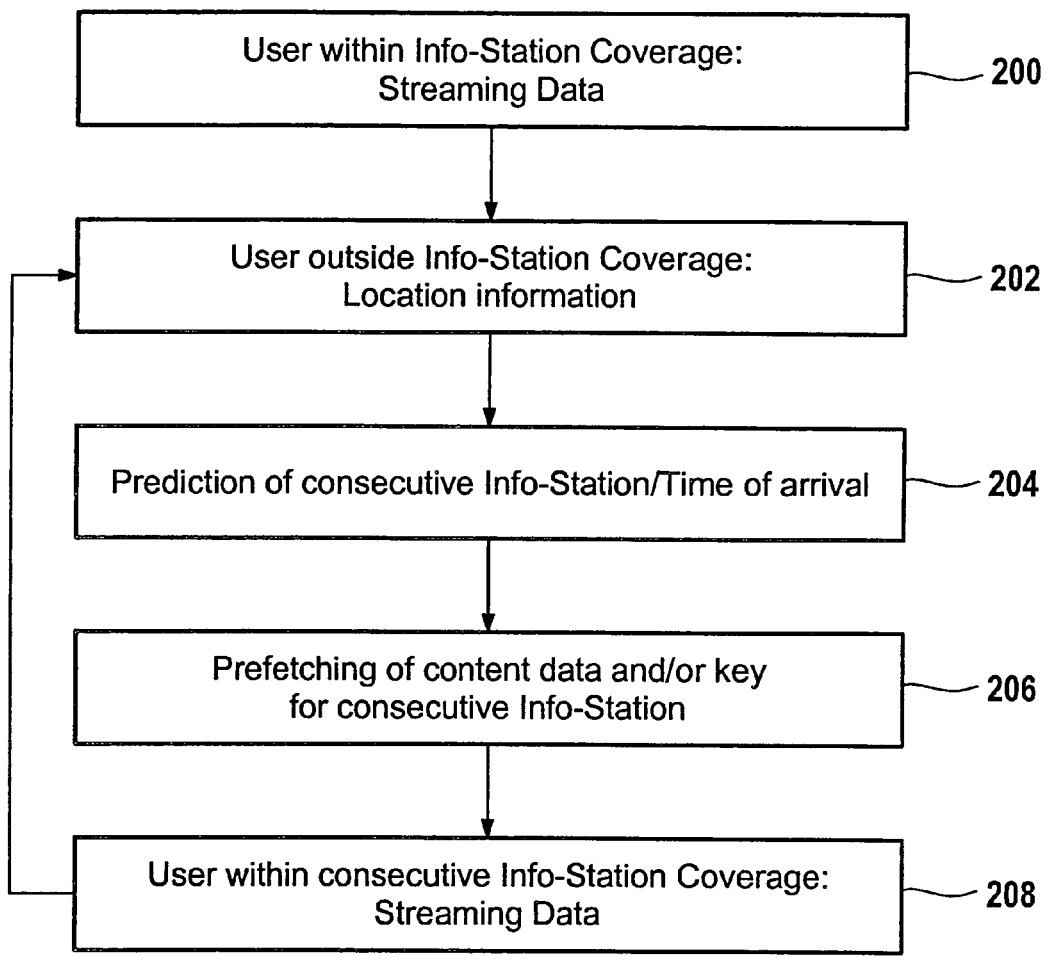
FIG. 2 is a flow chart of a preferred embodiment of a method of the invention.

FIG. 2 shows a corresponding flow chart. In step 200 a user with his or her mobile terminal is within the radio coverage of an info-station. Streaming data is transmitted from the info-station to the mobile terminal.

In step 202 the user has moved outside the radio coverage of the info-station. This means that the streaming of the data is interrupted. However, the user is still within the coverage of a wireless network that features location determination. The location of the user is determined and entered into the information server of the info-station network in step 202.

On this basis the information server of the info-station network performs a prediction of the consecutive info-station to which the user is likely to move. This can be done by extrapolating the users trajectory on the basis of continuous location information received from the wireless network. Continuous location information also enables to precisely predict the user's time of arrival in the consecutive info-station radio coverage. Alternatively, or in addition, an historical movement pattern of the user is taken into consideration. This enables to limit the amount of location information that is required by the information server in order to perform the prediction of the consecutive info-station on the users itinerary.

For example, the movement pattern consists of a number of alternative paths along which the user usually travels. The location information received from the wireless network enables information server of the infostation network to determine which one of the user's usual paths is the actual one. The determination of the path implies prediction of the consecutive info-station target cell.

Once the prediction of the consecutive target cell has been made, content data and/or the cryptographic key is prefetched into the local server of the predicted consecutive info-station (step 206). This way streaming of the data is immediately resumed in step 208 when the user moves within the radio coverage of the predicted info-station. When the user moves on its path outside the radio coverage the same procedure is carried out with respect to the next target cell on the user's path. In other words the control goes back from step 208 to step 202.

Figure 3:
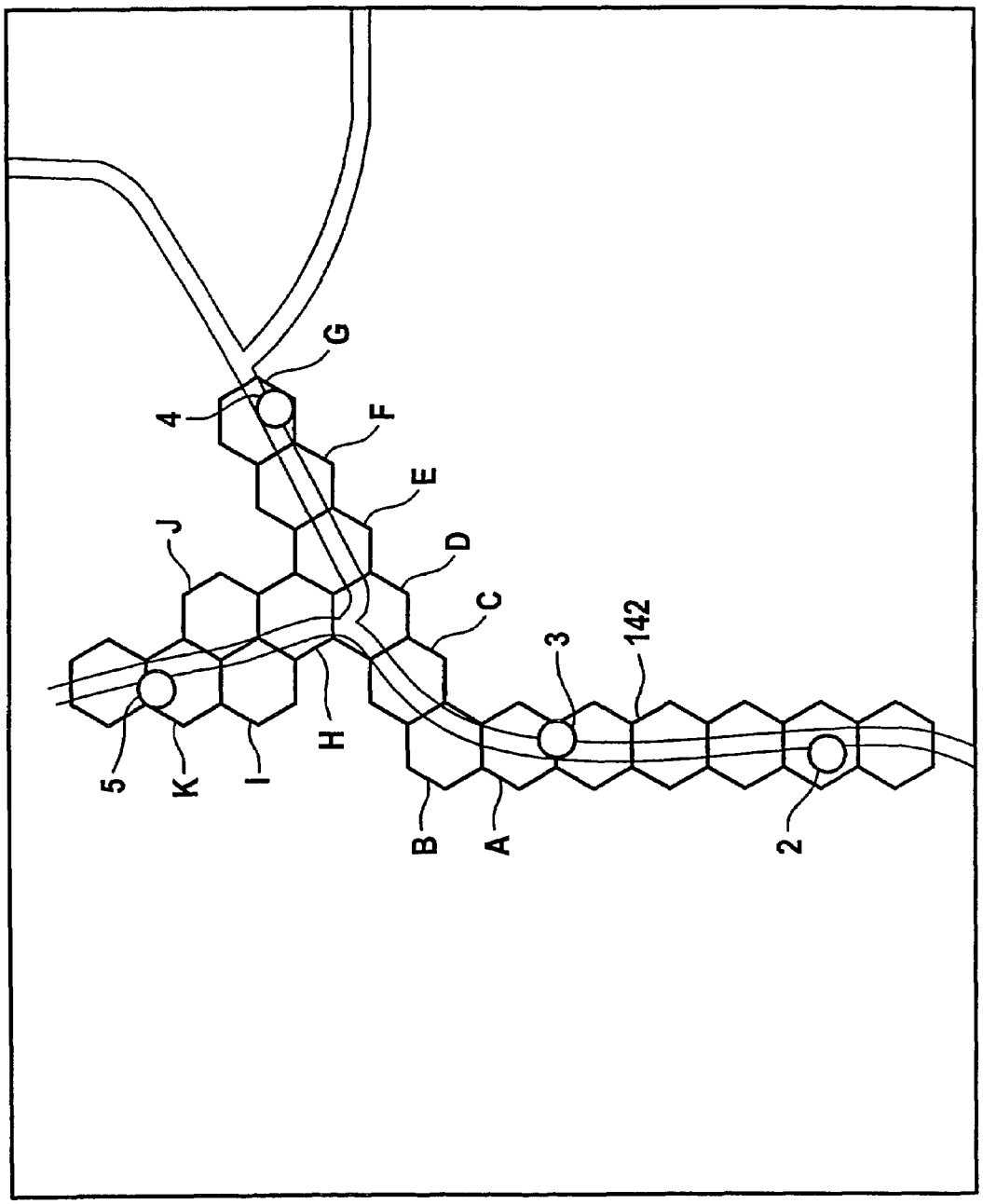
FIG. 3 is illustrative of an application of the present invention.

FIG. 3 illustrates an implementation example of a telecommunication network of the invention. Info-stations 2, 3, 4 and 5 are positioned along roads in an urban area. This urban area is also covered by a cellular telecommunication network having a number of cells 142 that provide continuous coverage.

In a fist step a movement pattern of a user is observed. Typically the user moves from info-station 2 to info-station 3 and then onwards to info-station 5 or alternatively to info-station 4. Hence in the example considered here, the user's typical movement pattern has a bifurcation and is thus ambiguous.

In the preferred embodiment considered here the information server of the info-station network subscribes to location information from the present server of the wireless cellular telecommunication network. The location information is received in terms of cell IDs of cells of the cellular wireless telecommunication network. Hence, when the user moves from info-station 3 to info-station 4 the information server receives the following sequence of cell-IDs: A, B, C, D, E, F, and G. When the user moves on the alternative path from info-station 3 to info-station 5 the information server receives the following sequence of cell IDs: A, B, C, D, H, I, J, K. From this information the information server infers that (i) There is a bifurcation at cell D and
(ii) Cells E and H are consecutive to the bifurcation.

In the following the information server only requests location information from the presence server of the cellular wireless telecommunication network when the user has moved past info-station 3 on his or hers usual itinerary. The request for location information of information server to the present server is specific to cells H and E. In other words, the information server only requires location information from the presence server when the user has moved to cell E or H, as this is the only information the information server requires in order to determine whether the user moves into to the direction of info-station 5 or alternatively into the direction towards info-station 4.

Hence, the information server requests location information from the presence server indicating the two cell IDs that follow a bifurcation in the users movement pattern in order to receive a notification from the presence server that indicates to which one of the alternative cells that follow the bifurcation the user has actually moved. On this basis the information server removes the ambiguity regarding the user's itinerary and determines the consecutive target info-station, i.e. info-station 4 in case cell E is indicated by the presence server or info-station 5 in case cell H is indicated by the presence server. This way the data volume of location information that is transmitted from the presence server to the information server is drastically reduced.

LIST OF REFERENCE NUMERALS

2 Info-Station
3 Info-Station
4 Info-Station
5 Info-Station
100 Cell
102 Cell
104 Local Server
106 Air Interface
108 Memory
110 Buffer Memory
112 Local Server
114 Air Interface
116 Memory
118 Buffer Memory
120 Information Server
122 Transport Network 124
124 Content Server
126 Data Stream
128 Data Box
130 Presence Server
132 Transport Network
134 Wireless Network
136 User
138 Mobile Terminal
140 Report
142 Cell

The invention claimed is:

1. A telecommunication method for a telecommunication network providing radio coverage which is discontinuous, the telecommunication network having a plurality of cells, the method comprising:
   providing a data stream to a mobile terminal within a coverage area of a first one of the plurality of cells,
   interrupting the data stream when the mobile terminal is moved outside the radio coverage of the telecommunications network,
   determining a location of the mobile terminal when the mobile terminal is outside the radio coverage of the telecommunications network,
   predicting a second one of the plurality of cells to be a target cell of the mobile terminal on based on the determined location,
   providing the data stream to a server being assigned to the second one of the plurality of the cells, and
   resuming the data stream to the mobile terminal when the mobile terminal is moved within a coverage area of the second one of the plurality of the cells from outside the radio coverage of the telecommunication network.

2. The telecommunication method of claim 1, wherein the data stream is encrypted and further comprising transmitting a cryptographic key to the server prior to arrival of the mobile terminal within the coverage of the second one of the plurality of cells.

3. The method of claim 1, further comprising:
   providing data descriptive of a plurality of alternative itineraries of the mobile terminal, and
   determining an itinerary of the plurality of alternative itineraries based on the determined location,
   wherein the predicting of the second one of the plurality of the cells is performed based on the determined itinerary.

4. The method of claim 1, further comprising predicting a time of arrival of the mobile terminal within the coverage area of the second one of the plurality of the cells for resumption of the data stream.

5. A computer program product for a telecommunication network providing radio coverage which is discontinuous, the computer program product comprising instructions for:
   entering location information being descriptive of a location of a mobile terminal when the mobile terminal is outside the radio coverage of the telecommunication network,
   predicting one of a plurality of cells of the telecommunication network to be the target cell of the mobile terminal based on the location information, and
   providing a data stream to the one of the plurality of the cells prior to arrival of the mobile terminal within a coverage area of the one of the plurality of the cells from outside the radio coverage of the telecommunication network.

6. The computer program product of claim 5, the instructions being adapted to provide a cryptographic key to a server being assigned to the one of the plurality of cells prior to arrival of the mobile terminal within the coverage of the one of the plurality of cells.

7. The computer program product of claim 5, further comprising instructions for:
   acquiring of a movement pattern of the mobile terminal,
   identification of a bifurcation location in the movement pattern,
   requesting location information from a presence server being indicative of an actual location of the mobile terminal past the bifurcation.

8. A telecommunication network comprising:
   a plurality of cells providing radio coverage which is discontinuous; and
   a controller for controlling the transmission of a data stream to the plurality of cells, the controller being adapted to be coupled to a presence server for receiving of location information regarding a location of a mobile terminal when the mobile terminal is outside the radio coverage of the plurality of cells, and the controller being adapted to control a transmission of a data stream to the mobile terminal based on the location information,
   the control server having a storage component for storing of information being descriptive of a historical movement pattern of the mobile terminal for prediction of a target cell of the plurality of cells when the mobile terminal is outside the radio coverage.

9. The telecommunication network of claim 8, the presence server belonging to a network providing continuous radio coverage.

* * * * *